US012545514B2

(12) United States Patent
Wolff et al.

(10) Patent No.: US 12,545,514 B2
(45) Date of Patent: Feb. 10, 2026

(54) SYSTEM AND METHOD FOR PROCESSING A MULTIPLICITY OF PICKING ORDERS WITH A PLURALITY OF ARTICLES

(71) Applicant: Dematic GmbH, Heusenstamm (DE)

(72) Inventors: Thomas Wolff, Münster (DE); Juri Felker, Wiesbaden (DE)

(73) Assignee: Dematic GmbH, Heusenstamm (DE)

( * ) Notice: Subject to any disclaimer, the term of this patent is extended or adjusted under 35 U.S.C. 154(b) by 588 days.

(21) Appl. No.: 18/063,201

(22) Filed: Dec. 8, 2022

(65) Prior Publication Data

US 2023/0183006 A1 Jun. 15, 2023

(30) Foreign Application Priority Data

Dec. 9, 2021 (DE) .......................... 102021132568.4

(51) Int. Cl.
*G06F 7/00* (2006.01)
*B65G 1/04* (2006.01)
*B65G 1/137* (2006.01)

(52) U.S. Cl.
CPC ......... *B65G 1/1373* (2013.01); *B65G 1/0485* (2013.01)

(58) Field of Classification Search
CPC ............... B65G 1/1373; B65G 1/0485; B65G 2201/0229; B65G 1/1378; B65G 1/0457; B65G 1/00; B65G 2201/00–027; B65G 2201/0285; B65G 2203/00; B65G 2205/00; B65G 2209/00; B65G 2812/02079; B65G 1/02; B65G 1/026; B65G 1/0492; B65G 1/12; B65G 1/137–1375; B65G 1/1376; B65G 2201/02; B65G 2201/0258; G06Q 10/087; G06Q 10/08–083; G06Q 10/0833; G06Q 10/0843; G06Q 10/0872; G06Q 10/0874–08743; G06Q 10/0877–08772;
(Continued)

(56) References Cited

U.S. PATENT DOCUMENTS

2020/0189846 A1\* 6/2020 Sutter .................. B65G 1/1376

FOREIGN PATENT DOCUMENTS

DE           10039394 C1 \*  9/2001  ......... B65G 47/5113
DE    102011104511 B3      4/2013
(Continued)

*Primary Examiner* — Yolanda R Cumbess
(74) *Attorney, Agent, or Firm* — Gardner, Linn, Burkhart & Ondersma LLP

(57) ABSTRACT

A system for processing picking orders each having a plurality of articles, includes a replenishing storage, at least one reloading station connected to the replenishing storage for reloading of articles for hanging transportation, and a buffer storage connected to the reloading station with parallel circulating storages for hanging transports. A controller allocates orders to be picked to each circulating storage and generates a list and quantity of all articles per circulating storage, and supplies the articles present therein to the respective circulating storage. The controller checks each circulating storage to determine whether a) articles for the fulfilment of an original order are present, and/or b) articles for the fulfilment of another order to be treated preferentially are present, and/or c) articles for the fulfilment of another order to be treated preferentially are present in two or more circulating storages. Thereupon the articles are discharged from the respective circulating storage.

13 Claims, 3 Drawing Sheets

(58) Field of Classification Search
CPC .... G06K 2017/0048; G06K 2017/0051; B07C 5/36; B07C 5/38; B07C 3/00; B07C 3/08
USPC ................. 700/213–216, 223–224, 228, 230
See application file for complete search history.

(56) References Cited

FOREIGN PATENT DOCUMENTS

| | | |
|---|---|---|
| DE | 102018221043 A1 | 12/2018 |
| EP | 2196415 A2 | 6/2010 |
| EP | 2130968 B1 | 9/2010 |
| EP | 1964792 B1 | 4/2012 |
| EP | 2766285 B2 | 10/2012 |
| EP | 2886494 A1 | 12/2013 |
| EP | 2789555 A1 | 10/2014 |
| EP | 3480142 A1 | 5/2019 |
| WO | 2013090958 A1 | 6/2013 |
| WO | 2014023539 A1 | 2/2014 |
| WO | 2017178225 A1 | 10/2017 |
| WO | 2018185231 A1 | 10/2018 |

\* cited by examiner

SYSTEM AND METHOD FOR PROCESSING A MULTIPLICITY OF PICKING ORDERS WITH A PLURALITY OF ARTICLES

CROSS REFERENCE TO RELATED APPLICATION

The present application claims the priority benefits of German patent application no. DE 10 2021 132 568.4, filed on Dec. 9, 2021.

BACKGROUND AND FIELD OF THE INVENTION

The invention relates to a system and a method for processing a multiplicity of picking orders with a plurality of articles.

EP 2 789 555 A1 discloses a device for order-orientated provision of individual goods for a plurality of orders from a warehouse, which comprises at least one intermediate storage, connected to a warehouse, for intermediate storage of individual goods of at least one order, a respective gathering area, connected to the at least one intermediate storage, for gathering the individual goods of the at least one completed order and a separating area, comprising a plurality of discharge lines, for order-orientated provision of the individual goods of the at least one completed order. Articles are thus fixedly allocated to orders and the device is then controlled on the basis thereof.

SUMMARY OF THE INVENTION

The present invention provides a flexible alternative for processing picking orders.

In accordance with the present invention it has become known that with the systems and methods of the present invention, a more flexible alternative for the processing of the picking orders and thus more rapid processing is possible, since preferential handling of higher priority orders is rendered possible. This is the case since a central controller is arranged to allocate a multiplicity of orders to be picked to each circulating storage and to generate or draw up from these orders an overall list of all articles and the quantity thereof per circulating storage and to supply the articles present therein to the respective circulating storage with the aid of the overall list, wherein the hanging bags are introduced via a switch into the respective circulating storage, and this central controller is also arranged to regularly check each circulating storage in order to determine whether a) all articles for the fulfilment of an original order are present, and thereupon actuates the switch at the output with the aid of the article identification device located there in order to discharge the articles of the order, and/or b) all articles for the fulfilment of another order to be treated preferentially are already present in the circulating storage, and thereupon actuates the switch at the output with the aid of the article identification device located there to discharge the articles of this other order and/or c) all articles for the fulfilment of another order to be treated preferentially are already present, distributed into two or more circulating storages, and thereupon actuates the switches at the output of the respective circulating storage with the aid of the article identification devices located there to discharge the articles of this other order.

Thus, the buffer storage is not filled with articles purely according to fixedly allocated orders but rather according to more flexible overall lists and the articles already present in the circulating storages of the buffer storage are changed in a variable manner in the order allocation as required and repurposed for different, more urgent orders. This soft allocation renders possible more flexible processing of the picking orders.

Hanging transports or hanging transport retainers or means suitable for hanging transportation are e.g. hanging bags or clothes hangers and the like. The articles are preferably transported individually therein or thereon.

The system as a whole comprises at least one replenishing storage which is connected to at least one reloading station for reloading purposes for hanging transportation. The connection is preferably effected via a conveyor system which is adapted to the type of storage of the articles in the replenishing storage. This can be e.g. a roller conveyor or a belt conveyor. The replenishing storage will usually be a container storage or tray storage.

The reloading station is in turn connected to the buffer storage. In this case, a circulating hanging conveyor section is preferably provided, from which the parallel circulating storages branch off or are connected via the switches. The hanging conveyor section is preferably a hanging conveyor section with a chain drive, which moves hanging conveyor bags via entrainers/adapters or moves clothes hangers directly, as described e.g. in EP 2 886 494 A1 and EP 3 480 142 A1, which are incorporated herein by reference.

Hanging bags (often referred to as transport bags) are preferably ones as described in EP 3 442 884 A1. In addition, bags such as those known e.g. from EP 2 130 968 B1 may also be used. Both of which are incorporated herein by reference.

In general, the hanging bags comprise two bag walls which are connected to each other at an upper end via a bracket, on which a suspension device serves for suspension in a rail of a conveyor device or in an adapter which in turn runs in a rail. The bag walls can be fixedly connected at the bottom, e.g. via a strap. The bags can also be closed at the sides. Only one article is usually transported per hanging bag in each case.

The reloading station for the reloading of articles for hanging transportation is a manual and/or automated or fully automated induction station, in which the articles are reloaded from the replenishing storage, preferably individually, into hanging bags which are already hooked in the hanging conveyor, or in which the articles from the replenishing storage are hooked in by means of clothes hangers. This is known from e.g. EP 3 442 884 A1 and Dürkopp EP 2 196 415 A1. Each reloading station is preferably connected to a respective aisle of the replenishing storage. However, it is also possible in the case of a higher through-put of the reloading stations, e.g. by means of greater automation or dual operation by two pickers, to attach two aisles to each reloading station.

The central controller is arranged to allocate a multiplicity of orders to be picked to each circulating storage and to draw up from these orders an overall list of all articles and the quantity thereof per circulating storage and to supply the articles present therein to the respective circulating storage with the aid of the overall list, wherein for this purpose the hanging bags are introduced via a switch into the respective circulating storage. The central controller is preferably a warehouse management system (WMS) in which all necessary processes are represented, such as storage structure, master data management, stock management, transportation management, internal storage processes (transfer, replenishment, reclassification, control station), goods intake (notification, collection, deconsolidation, quality control, placement into storage), goods output (order management, picking, consolidation, packing, dispatch), etc. The central controller is also configured to delete articles of fulfilled or discharged orders from the overall list of the respective circulating storage. The central controller is also configured to treat preferentially orders during processing which have a higher or raised priority and/or the other order to be treated preferentially is not present on the original overall list. It is useful if the central controller is arranged to check the circulating storage regularly during the introduction of articles, i.e. to carry out a check for the above-mentioned criteria a, b or c with each introduction process.

The replenishing storage is a "quick" system which should be able to remove from storage or replenish the requested articles within 5-15 minutes. For this purpose, automatic small-item storages (SIS) are used for containers with rack serving apparatuses. In particular, those with single-level rack serving apparatuses, such as shuttles, in which a respective single-level rack serving apparatus travels in practically every aisle and level to place articles into storage and remove them from storage. The applicant's EP 1 964 792 a1, which is incorporated by reference, discloses e.g. a storage for providing transport units from a storage in a desired sequence to at least one gathering area. Rack serving apparatuses in each storage rack aisle, lift for removal from storage and track for removal from storage are controlled and supplied with goods in a manner adapted to one another such that said goods ultimately end up sorted in the gathering area or are delivered therefrom, which is suitable to be a replenishing storage. The replenishing storage is preferably such a storage with single-level rack serving apparatuses as rack serving apparatuses which run in the aisles between the racks, wherein the racks are of double or multiple depths and stand back to back, which as a whole should be designated shuttle storages.

In a preferred embodiment the single-level rack serving apparatuses travel in each aisle and in each level. In addition, it is useful if the vertical transfer lifts for placing the articles into storage and removing them from storage are decoupled via adjacent conveyors, as is also described in EP 2 794 430 A1. If necessary, a container exchange can take place in the transverse direction (across the aisles) using a conventional conveyor system (transverse conveyors or conveying loop) in the pre-zone and/or via transverse transportation, as described e.g. in EP 2 741 977 A1 or EP 3 606 846 A1.

When the shuttle storage is used as the replenishing storage, the reloading stations can be fully used to capacity, which, when sequencing is also no longer used, means that the desired short provisioning times of at most 15-20 minutes of all articles of an order is achieved in the buffer storage or circulating storage. The articles of an order are then only consolidated in the buffer storage or circulating storage. This time is the result of the dynamics of the shuttle storage to which the reloading stations are attached. In order to be able to supply the reloading stations with storage containers continuously, a specific "workload" of active orders is required. In accordance with the invention it amounts to 15-20 minutes in the case of a shuttle storage.

The replenishing storage can be supplied with containers with only one type of article and also with mixed article containers. It is advantageous if the replenishing storage itself is supplied with mixed containers from a (further) central storage. In particular it is advantageous if, in that case, with respect to articles of different orders, mixed containers are provided in order to supply the replenishing storage. These are provided from the central storage in which a picker manually fills order-orientated containers with different articles of a plurality of orders in a mixed manner, which orders are either single-article orders or orders which are provided together for processing within approximately 15-minute slots in each case. In so doing, a plurality of pickers move in parallel through the central storage and fill, in their zone, mixed containers they each take with them (mini-batches), which are each assigned to a slot or time segment of a provided processing time (ca. 1 hour in future). These mixed containers are then introduced into the replenishing storage, in particular shuttle storage, for buffering/intermediate storage or consolidation and supply of the reloading station. The replenishing storage is thus fed with mixed mini-batches. A mini-batch thus consists of one or a plurality of load carriers which are allocated to a common removal-from-storage time window out of the replenishing storage. The articles located in one or a plurality of load carriers are for different orders. In that case, it is preferred if the number of the articles present therein is selected in such a way that it corresponds to the speed of an automatic replenishing storage (e.g. a shuttle storage) and permits even quicker provision of articles. In contrast to containers with only one type of article, these mixed containers are always completely emptied or reloaded in the reloading stations and move via a circuit either back into the central storage and/or to the goods intake area for re-use.

Containers with only one type of article for the replenishing storage are provided in parallel from a goods intake area. At the reloading stations, these containers, if they are not emptied, are transported back into the replenishing storage and placed into storage after reloading of the required number of articles.

It is also conceivable that, depending on the size of the system as a whole, a plurality of replenishing storages and also a plurality of reloading station regions are also provided, which are connected to each other via additional sorters, such as bag sorters, in order each to supply the correspondingly arranged buffer storage. But nevertheless, if possible all articles of an order are then preferably provided from the same replenishing storage.

The article identification device(s) or article identifier is/are preferably sensors which read bar codes, RFID etc. or image recognition by means of a camera in order to detect the articles or hanging conveyor means and therefore indirectly the articles. Alternatively, the position of an article can also be tracked via an allocated window in the conveyor system during introduction at the reloading station.

If the article identification device is additionally also disposed at the intake, articles can be identified and the switch can easily be actuated in order to introduce the articles of the overall list into the respective circulating storage. A respective switch with a respective article identification device is preferably provided at the intake and at the output of each circulating storage, which are connected to the central controller.

The buffer storage is fitted with a plurality of circulating storages depending on the requirement of the system as a whole. The number of circulating storages is usually between 4 and 20. The circulating storages themselves preferably have a capacity of 50-400 hanging bags. The circulating storages each have a separate drive and are controlled independently of each other and so as to be able to drive the supplying and discharging hanging conveyor sections.

Packing stations can be disposed downstream behind the discharge point in order to complete the orders for dispatch.

These can be disposed of on a central hanging conveyor discharge section or be reachable via separate conveyor stages.

In order to fulfil the remaining (original) order, missing articles are placed on the overall list and delivered subsequently via the replenishing storage. This is possible within a short time (max. 15 minutes) by reason of the design thereof.

Further details of the invention will become clear from the following description of exemplified embodiments by reference to the drawings.

DESCRIPTION OF THE PREFERRED EMBODIMENTS

Figure 1:
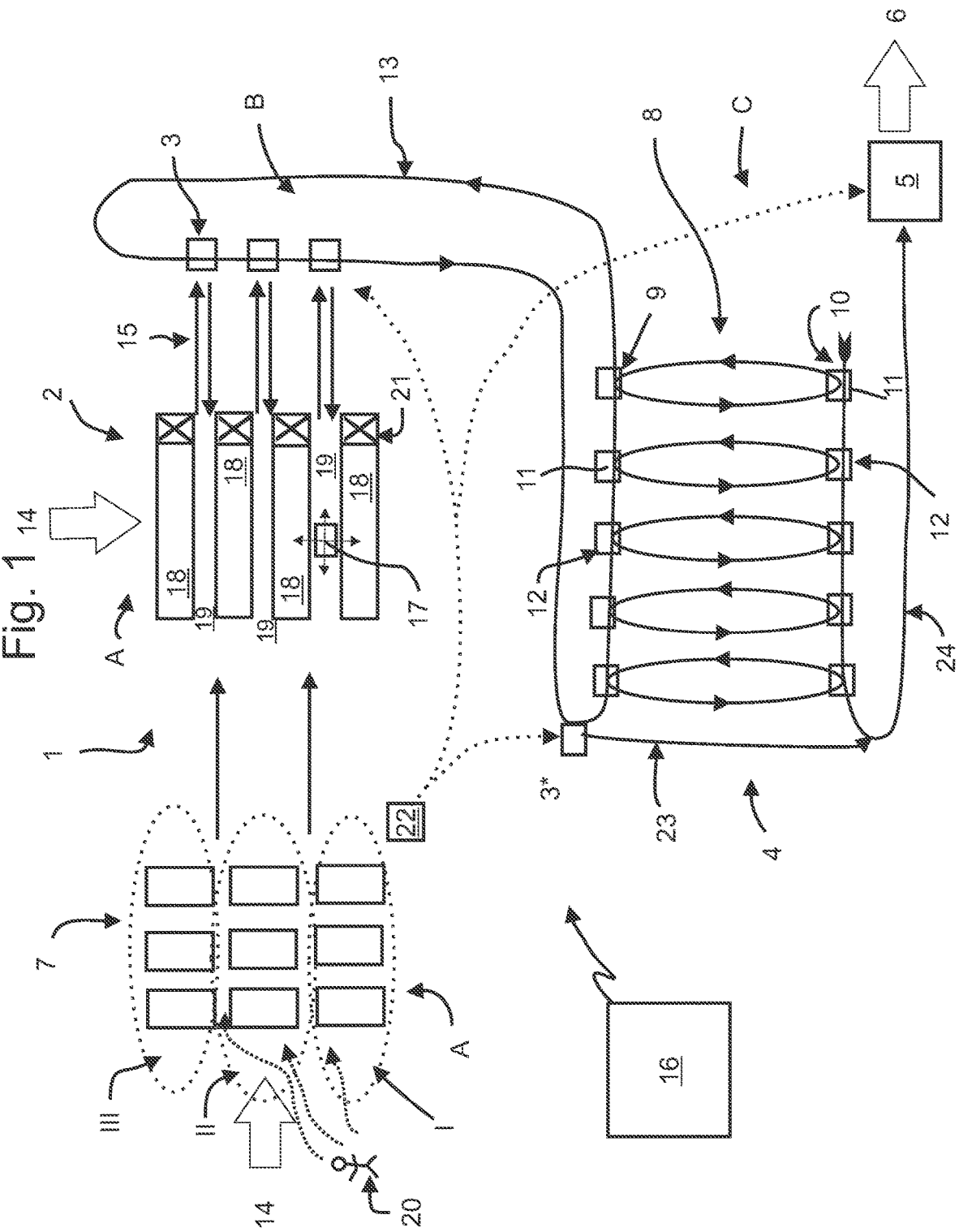
FIG. 1 shows a schematic view of a system for processing a multiplicity of picking orders in accordance with the present invention.
Figure 2:
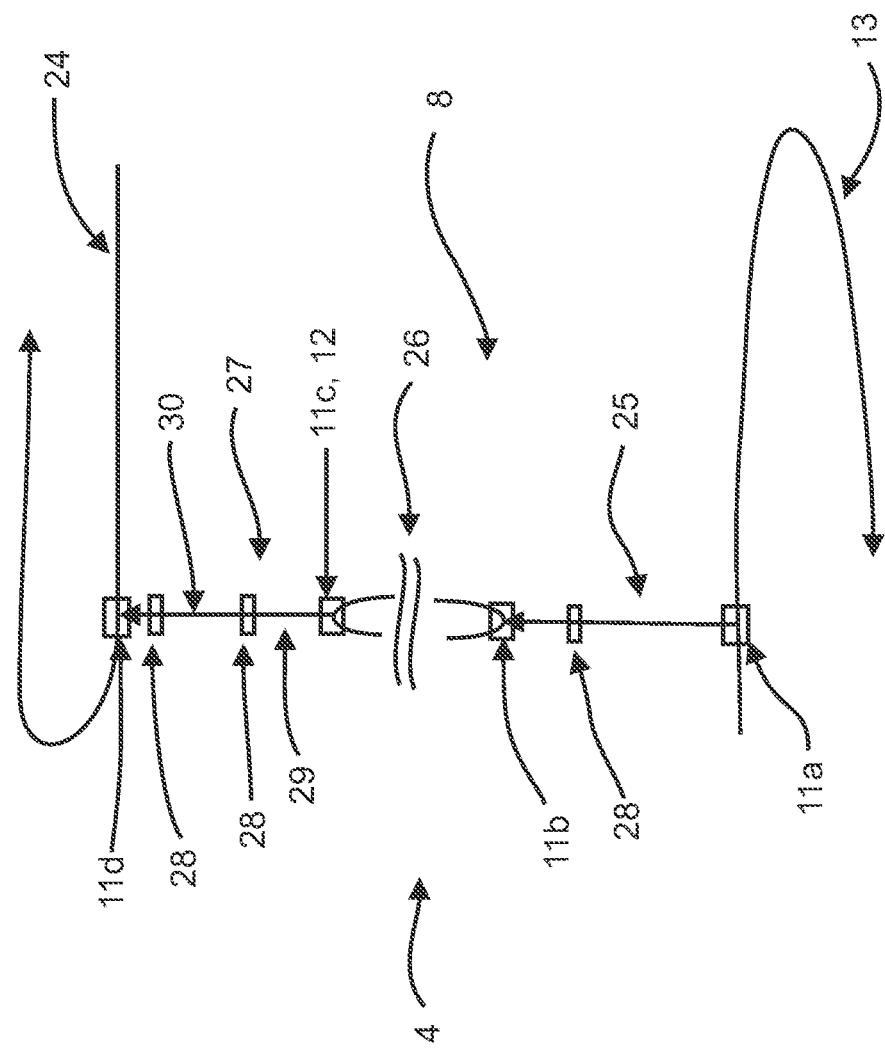
FIG. 2 shows a more detailed view of the area where articles are removed from storage out of the circulating storage.

The figures show a system—designated as a whole by 1—for processing a multiplicity of picking orders with a plurality of articles. The system generally comprises a storage area A with an automatic container replenishing storage 2 and with a manual central storage 7, a reloading area B adjoining same and having a plurality of reloading stations 3 for reloading of articles out of the containers for hanging transportation in hanging conveyor bags, a storage area C supplied thereby and having a buffer storage 4 with circulating storages 8 for the hanging conveyor bags and a packing area 5 adjoining same and having a plurality of packing stations and a dispatch area 6.

The manual central storage 7 is used to supply the replenishing storage 2 with mixed containers. It consists of shelved racks which are separated from each other by aisles, through which a plurality of pickers 20 walk and, on trolleys taken with them, pick articles from the shelves into containers on the trolley. In so doing, the pickers are guided by devices such as pick-to-voice or pick-to-light or manual order lists etc. In the storage 7, the pickers 20 manually fill containers in an order-orientated manner mixed with different articles of a plurality of orders, in that they move through their respective zone I, II, III and in so doing process the allocated article lists. The respectively assigned articles originate either from individual article orders or orders which are provided together within approximately 15-minute slots in each case for processing in the circulating storage 8. For this purpose, the plurality of pickers 20 move in parallel through the central storage 7 in their repective zones I, II, III, and fill containers they each take with them with articles of different orders, each of which orders are assigned to a slot or time segment for a designated processing time (approximately 1 hour in the future). The mixed containers thus filled by the pickers 20 are grouped across all zones and pickers 20 after completion of the 15-minute time slots in order to complete the orders together that are to be provided in the designated future processing time period. The containers are taken along by the pickers 20 on a trolley which is then unloaded after their walk ends, wherein the containers are introduced into the replenishing storage 2 via a suitable station and conveyor system.

In contrast to containers with only one type of article, these mixed containers are always completely emptied or reloaded in the reloading stations and move via a circuit either back into the central storage and/or to the goods intake area for re-use.

The replenishing storage 2 is supplied with containers with only one type of article from a goods intake area 14 and with mixed containers from the central storage 7. A plurality of reloading stations 3 are supplied with containers for reloading of the articles out of the containers in hanging conveyor bags for hanging transportation. For this purpose, each reloading station 3 is respectively connected to an aisle of the replenishing storage via conveyors 15 for placing articles into storage and removing them from storage.

The replenishing storage 2 is a multi-aisle and multi-level rack storage which is operated by means of single-level rack serving apparatuses, so-called shuttles 17, which, from the aisles 19, supply the storage locations in the racks 18 with containers and remove them from same. The containers can then be transported, via lifts 21 and conveyors 15 attached thereto, to and from the reloading stations 3. Thus each aisle is attached to a reloading station 3.

The buffer storage 4 connected to the reloading stations 3 via a hanging conveyor loop 13 comprises a multiplicity of parallel circulating storages 8 for the hanging transports or hanging transport retainers or means.

The reloading stations 3 are manual or automatic stations in which the articles are reloaded individually from the containers into hanging conveyor bags. For this purpose, the suspended hanging conveyor bags are provided open so that articles can be placed inside manually or in an automated manner.

Therefore, via the hanging conveyor loop 13, the reloading stations 3 supply the buffer storages 4 with the hanging conveyor bags individually filled with articles, where they are stored in parallel circulating storages 8 until the completion of the articles of the respective order in order then to be transported via a gathering area 24 to a packing area 5 in order there to be repacked as determined by the order into dispatch containers. From that location, the orders or dispatch containers finally arrive at a dispatch area 6. It will be understood that an empty bag return out of the dispatch area is provided but not shown. During dispatch of the filled hanging conveyor bags at the reloading stations 3 into the hanging conveyor loop 13 these are tracked via allocated windows.

From the hanging conveyor loop 13 in the buffer storage 4, the hanging conveyor bags are introduced via switches 11 into the respective circulating storage 8 in a controlled manner. Each circulating storage 8 consists of an introducing conveyor 25, which is attached to the intake-side switch 11a and via which new hanging conveyor bags are placed into storage when the allocated window arrives at that location. A stopper 28 is also provided in the introducing conveyor 25 so that the hanging conveyor bags can be buffered in a targeted manner onto a free space in the rotating circulating conveyors 26 adjoining same. In a corresponding manner, a further controlled switch 11b is provided at the interface between the introducing conveyor 25 and circulating conveyor 26. Analogously to the introducing conveyor 25, a discharge conveyor 27 is provided at the output of the circulating conveyor 26 in order to remove required hanging conveyor bags from the circulating storage 8. In a corresponding manner, at the interface between the discharge conveyor 27 and circulating conveyor 26, an article identification device 12 and a further controlled switch 11c are provided in order to discharge the desired hanging conveyor bag onto the discharge conveyor 27 in a targeted manner. The discharge conveyor 27 comprises two areas 29, 30, separated by stopper 28, before it issues into the gathering area 24 via a further switch 11d. The first area 29 is a reserve area in order to achieve a continuous movement of the hanging conveyor bags. The second area 30 is a gathering area for grouping hanging conveyor bags. The introducing conveyor 25 and the discharge conveyor 27 are preferably located on opposite sides of the circulating conveyor 26. In a circulating storage 8 there is selective access to each individual hanging conveyor bag (no FiFo).

Individual orders 22, i.e. the type of orders which comprise only a single article, can be handled separately in order to avoid congesting the system as a whole. This is indicated by the dotted arrows. Thus, such individual orders can be transported directly from the storage 7 to the reloading stations 3. Direct transport to the packing area 5 or a dedicated reloading station 3* is also conceivable, this reloading station supplying a bypass 23 which leads directly into the gathering area 24, bypassing the buffer 4. At the reloading station 3*, or the switch 11 thereof, individual orders originating from the normal reloading stations 3 in the delivery loop 13 can also be discharged in a targeted manner into the bypass 23.

The system 1 as a whole and its areas and all systems and devices located therein are controlled by a central controller 16. The controller 16 is arranged to allocate a multiplicity of orders to be picked to each circulating storage 8 and to draw up from these orders an overall list of all articles and the quantity thereof per circulating storage 8 and to supply the articles present therein to the respective circulating storage 8 with the aid of the overall list, wherein the hanging conveyor bags are introduced via the respective switch 11 into the respective circulating storage 8.

On the basis of the incoming orders, the controller 16 thus distributes the orders and therefore articles to specific circulating storages 8, from where overall lists are generated which control the provision of the articles from the replenishing storage 2 to the reloading stations 3 and finally the introduction of the articles into the circulating storage 8 according to the overall list. The supply of the replenishing storage 2 with mixed containers from the central storage 7 and containers with only one type of article via the goods intake area 14 goes along with this.

Thus, the controller 16 is arranged to regularly check each circulating storage 8 after the introduction of a new article with the aid of the article identification device 12 at the output of the circulating conveyor 26 to determine whether all articles for the fulfilment of an original order from the overall list are present, and thereupon to actuate the switch 11c with the aid of the article identification device 12 located there in order to discharge the articles of the order which therefore then arrives at the discharge conveyor 27 and subsequently at the gathering area 24 for supply to the packing area 5.

Thus, the controller 16 is likewise arranged to regularly check each circulating storage 8 after the introduction of a new article with the aid of the article identification device 12 at the output of the circulating conveyor 26 to determine whether all articles for the fulfilment of another order to be treated preferentially are already present in the respective circulating storage 8, and thereupon to actuate the switch 11c with the aid of the article identification device 12 located there in order to discharge the articles of this other order which therefore then arrives at the discharge conveyor 27 and subsequently at the gathering area 24 for supply to the packing area 5.

Alternatively, a check is thus also made as to whether all articles for the fulfilment of another order to be treated preferentially are already present, distributed into two or more circulating storages 8, and thereupon to actuate the switches 11c of the respective circulating storages 8 with the aid of the article identification devices 12 located there in order to discharge the articles of this other order onto the gathering area 24 for supply to the packing area 5. The articles then originate from more than one circulating storage 8.

Figure 3:
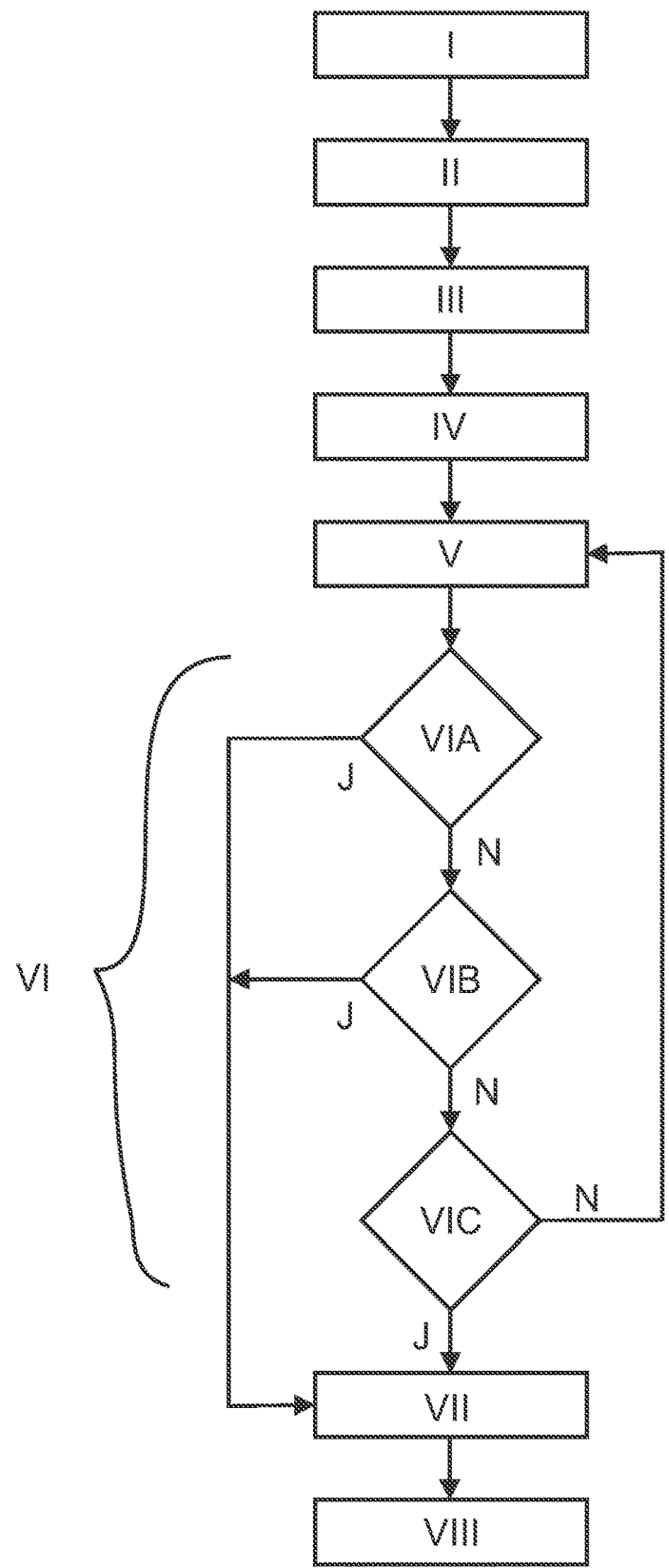
FIG. 3 shows a flow diagram of the material flow in the system in accordance with aspects of the present invention.

This procedure permits new urgent express orders with higher priority to be treated preferentially, i.e. to be handled earlier. Missing articles for the original order are then placed on the overall list and delivered subsequently within the 15 minutes. This procedure is generally described again with the aid of the flow diagram of FIG. 3.

Firstly, a multiplicity of orders, which originate e.g. from an e-commerce ordering system, are loaded in the system (step I). These orders are distributed to the circulating storages 8 (step II) and an overall list of the articles for each circulating storage 8 is generated therefrom, relating to the multiplicity of articles present in the orders (step III). By means of this list, the remainder of the system is controlled in order to supply the articles to the respective circulating storage 8 at the right time (step IV).

Each circulating storage 8 requests, so to speak, the articles of the overall list, which are provided in a controlled manner by the controller 16, beginning with the supply of the replenishing storage 2 from the goods intake area 14 or central storage 7, the removal from storage of the corresponding containers and reloading in the reloading stations 3 and conveying to the intake 9 of the respective circulating storage 8 (step V).

After introduction of a hanging conveyor bag via the switch 11a at the intake and the introducing conveyor 25 and the switch 11b, a check is regularly made in the respective circulating conveyor 26 of the circulating storage 8 by means of the controller 16 with the aid of the article identification device 12 at the switch 11c as to whether therefore all articles for the fulfilment of an order are present (step VI and VIC).

If this is not the case, further articles are awaited.

However, if all articles or hanging conveyor bags for the fulfilment of an order are present, these are discharged via the switch 11c onto the discharge conveyor and via the switch 11d onto the gathering area 24 (step VII) in order to be conveyed to the packing area 5 (step VIII). If appropriate, the stoppers 28 are inserted at the areas 29 and 30.

It will be understood that within the framework of the invention a "completed" order in this sense can also be a new order with higher priority which is therefore to be treated preferentially. This is also checked in step VI and sub-step VIA. A check is also made as to whether a new order with higher priority can be fulfilled when other circulating storage contents are taken into consideration (step VIB).

The invention claimed is:

1. A system for processing a multiplicity of picking orders each with a plurality of articles comprising:
   a replenishing storage for articles;
   at least one reloading station connected to the replenishing storage for reloading of articles for hanging transportation;
   a buffer storage connected to the at least one reloading station and comprising a multiplicity of parallel circulating storages for hanging transports, wherein at an intake and at an output of each circulating storage a respective switch is disposed and at the output a respective article identifier device is disposed; and a central controller arranged to allocate a multiplicity of orders to be picked to each circulating storage and to generate from these orders an overall list of all articles and the quantity thereof per circulating storage and to supply the articles present therein to the respective circulating storage with the aid of the overall list, wherein the hanging transports are introduced via a respective switch into the respective circulating storage;

wherein the controller is arranged to regularly check each circulating storage to determine one or more of a), b), or c) below:

a) whether all articles for the fulfilment of an original order are present, and thereupon actuates the switch at the output with the aid of the article identifier device located there in order to discharge the articles of the order, b) whether all articles for the fulfilment of another order to be treated preferentially are already present in the circulating storage, and thereupon actuates the switch at the output with the aid of the article identifier device located there to discharge the articles of this other order, and c) whether all articles for the fulfilment of another order to be treated preferentially are already present, distributed into two or more circulating storages, and thereupon actuates the switches at the output of the respective circulating storage with the aid of the article identifier identification devices located there to discharge the articles of this other order.

2. The system as claimed in claim 1, wherein the central controller is arranged to delete articles of fulfilled or discharged orders from the overall list of the respective circulating storage.

3. The system as claimed in claim 2, wherein the central controller is arranged to preferentially treat orders during processing that have a higher or raised priority.

4. The system as claimed in claim 3, wherein the other order to be treated preferentially is not present on the original overall list.

5. The system as claimed in claim 4, wherein the central controller is arranged to regularly check the circulating storage during the introduction of articles.

6. The system as claimed in claim 5, wherein the replenishing storage is a shuttle storage.

7. The system as claimed in claim 6, wherein the replenishing storage is supplied with mini-batches.

8. The system as claimed in claim 1, wherein the central controller is arranged to preferentially treat orders during processing that have a higher or raised priority.

9. The system as claimed in claim 8, wherein the other order to be treated preferentially is not present on the original overall list.

10. The system as claimed in claim 1, wherein the central controller is arranged to regularly check the circulating storage during the introduction of articles.

11. The system as claimed in claim 1, wherein the replenishing storage is a shuttle storage.

12. The system as claimed in claim 1, wherein the replenishing storage is supplied with mini-batches.

13. A method for processing a multiplicity of picking orders with a plurality of articles, said method comprising:

supplying, from a replenishing storage for articles, at least one reloading station connected to the replenishing storage for the reloading of articles for hanging transportation and wherein hanging transports are intermediately stored with a buffer storage connected to the at least one reloading station, wherein the buffer storage comprises a multiplicity of parallel circulating storages, and wherein a central controller is communicatively connected with a respective switch at an intake and at an output of each circulating storage;

allocating via the central controller to each circulating storage a multiplicity of orders to be picked;

generating via the central controller an overall list of all articles and the quantity thereof per circulating storage from these orders;

actuating the switch at the intake for introduction of the allocated articles of the overall list into the respective circulating storage; and determining, by regularly checking with the central controller each circulating storage, whether one or more of a), b), or c) below:

a) all articles for the fulfilment of an original order are present, and thereupon actuating the switch at the output with the aid of an article identifier device located there in order to discharge the articles of the order, b) all articles for the fulfilment of another order to be treated preferentially are already present in the circulating storage, and thereupon actuating the switch at the output with the aid of the article identifier device located there to discharge the articles of this other order, and c) all articles for the fulfilment of another order to be treated preferentially are already present, distributed into two or more circulating storages, and thereupon actuating the switches at the output of the respective circulating storage with the aid of the article identifier devices located there to discharge the articles of this other order.

* * * * *